G. E. JACKSON.
SELF TYING BALING PRESS.
APPLICATION FILED JULY 9, 1908.
919,585.
Patented Apr. 27, 1909
6 SHEETS—SHEET 2.
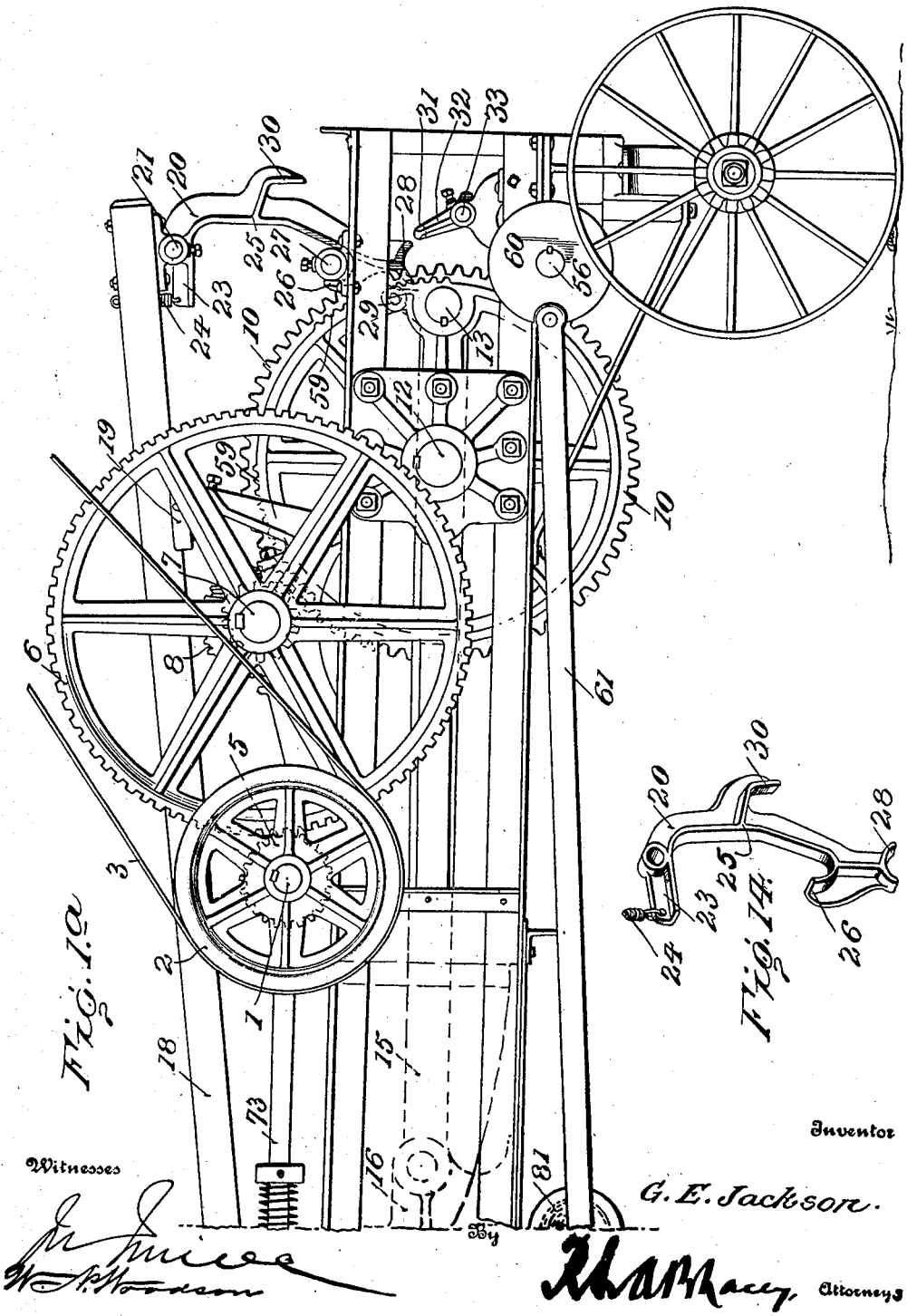

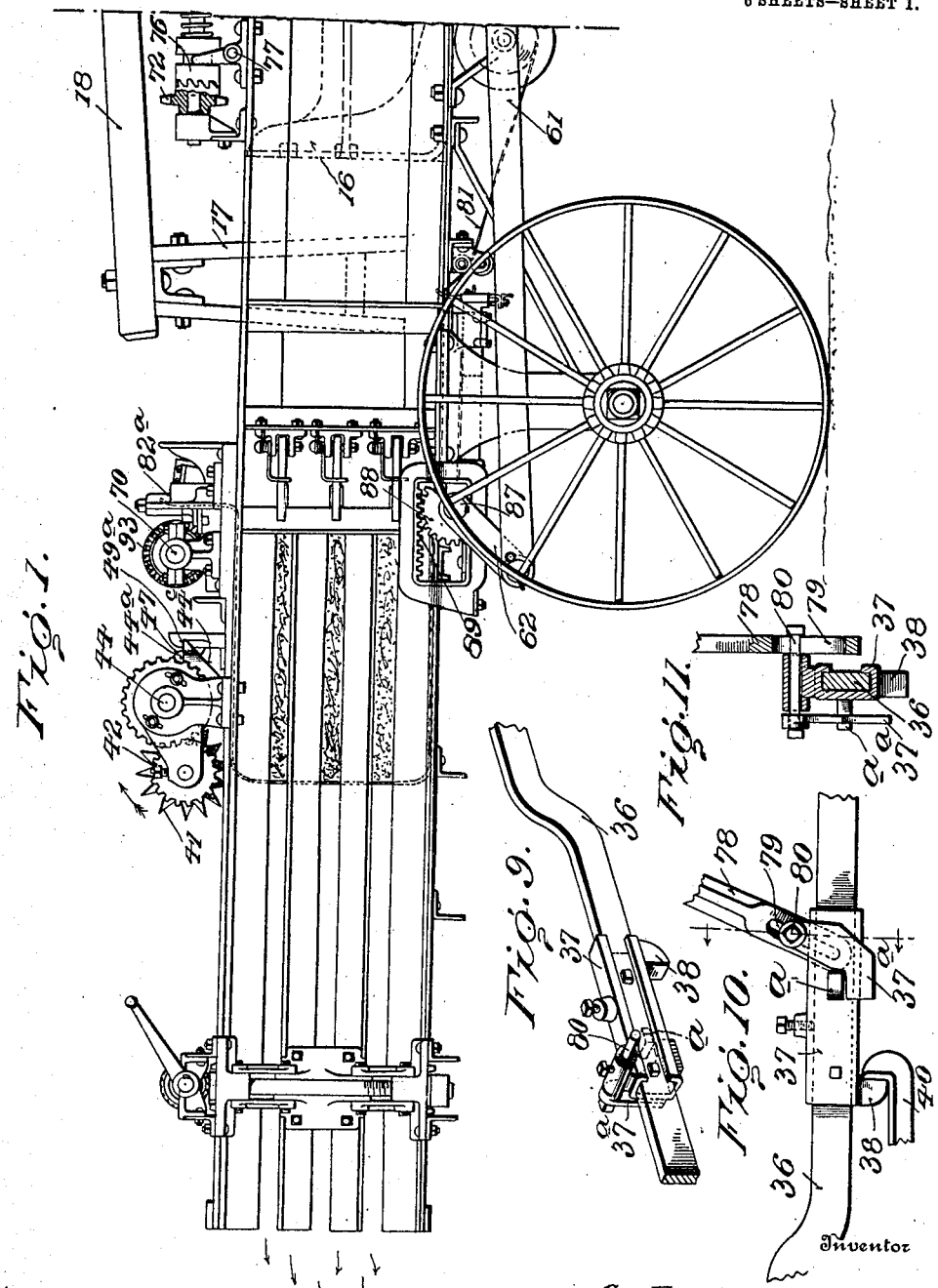

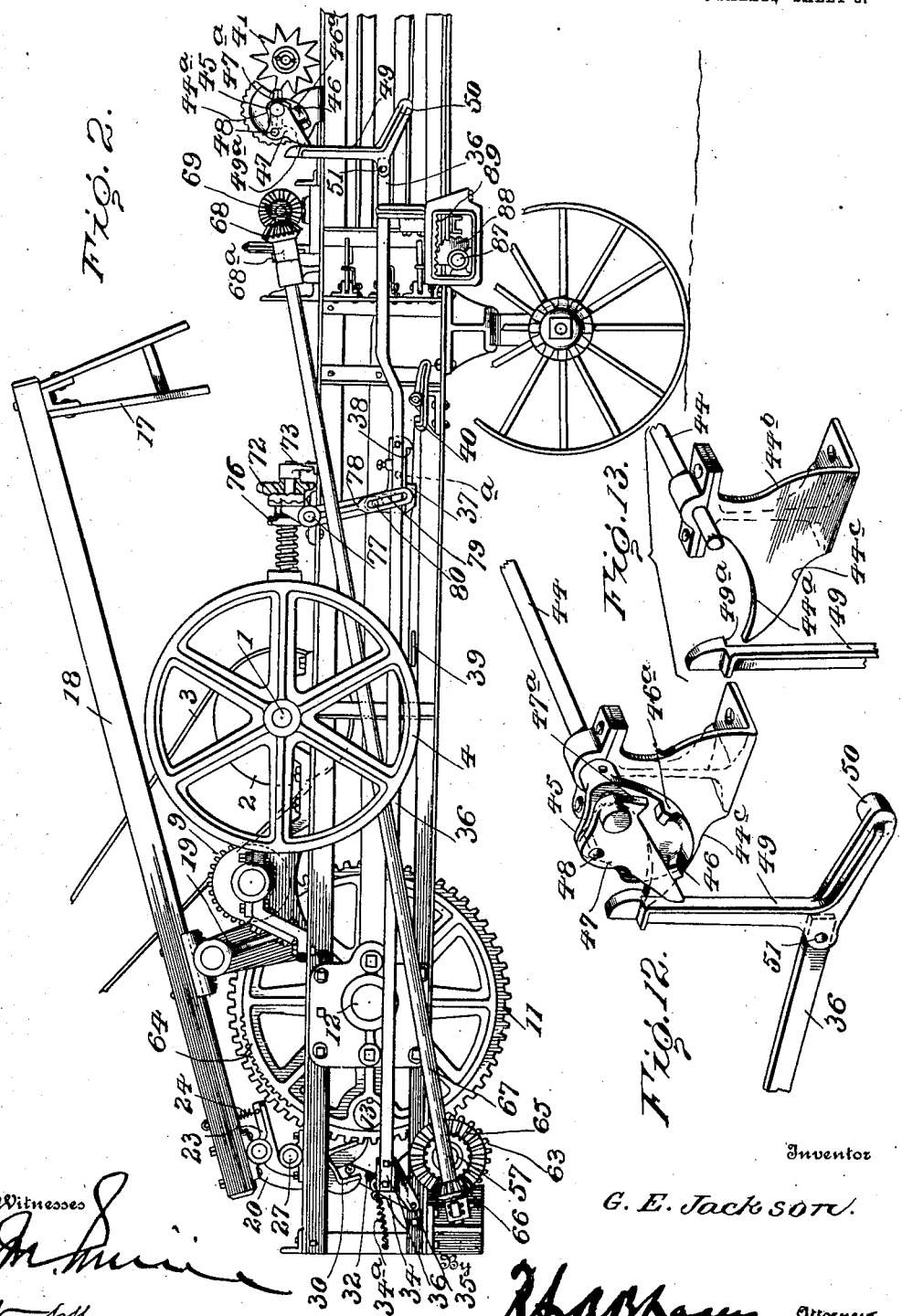

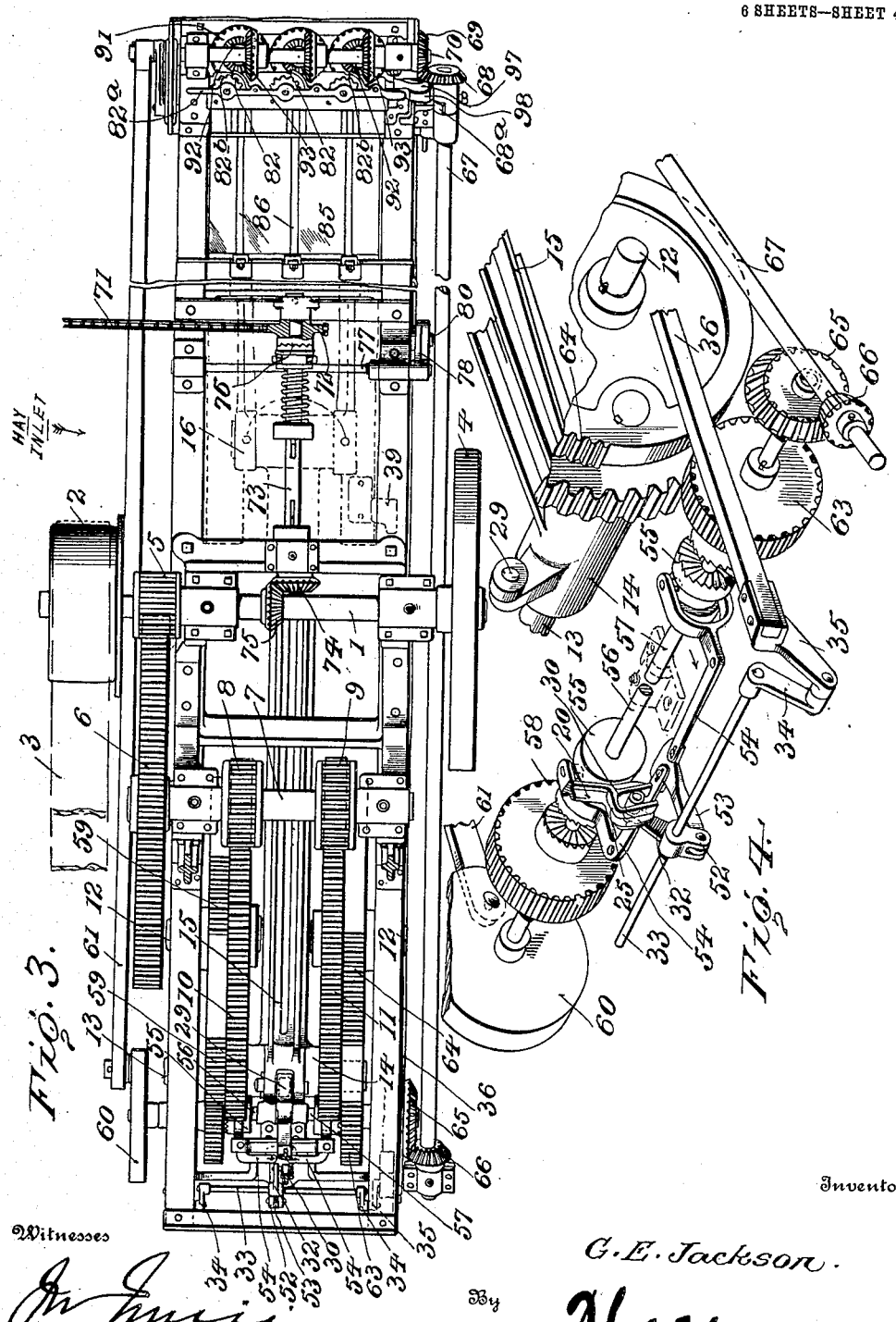

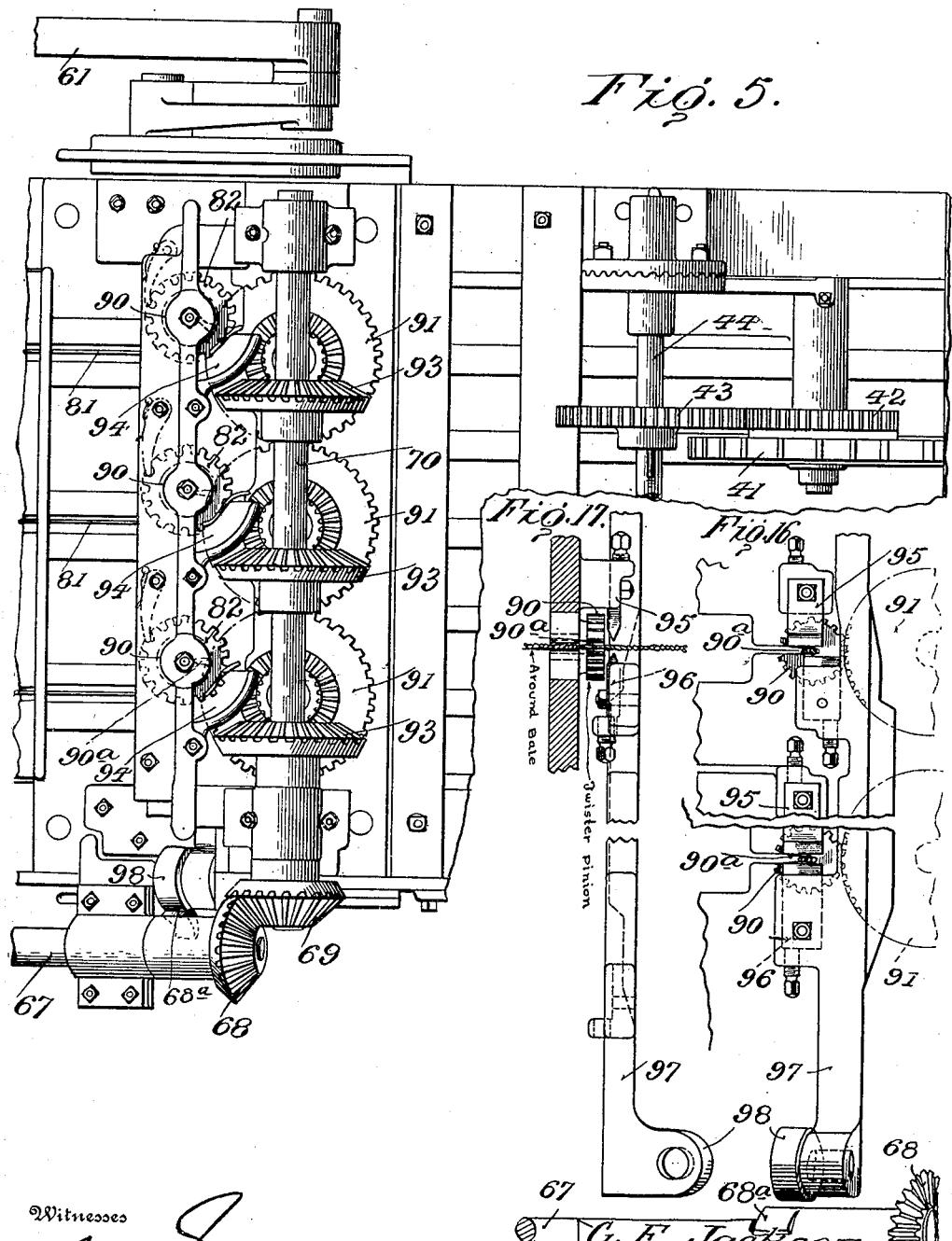

G. E. JACKSON.
SELF TYING BALING PRESS.
APPLICATION FILED JULY 9, 1908.
919,585.
Patented Apr. 27, 1909.
6 SHEETS—SHEET 6.
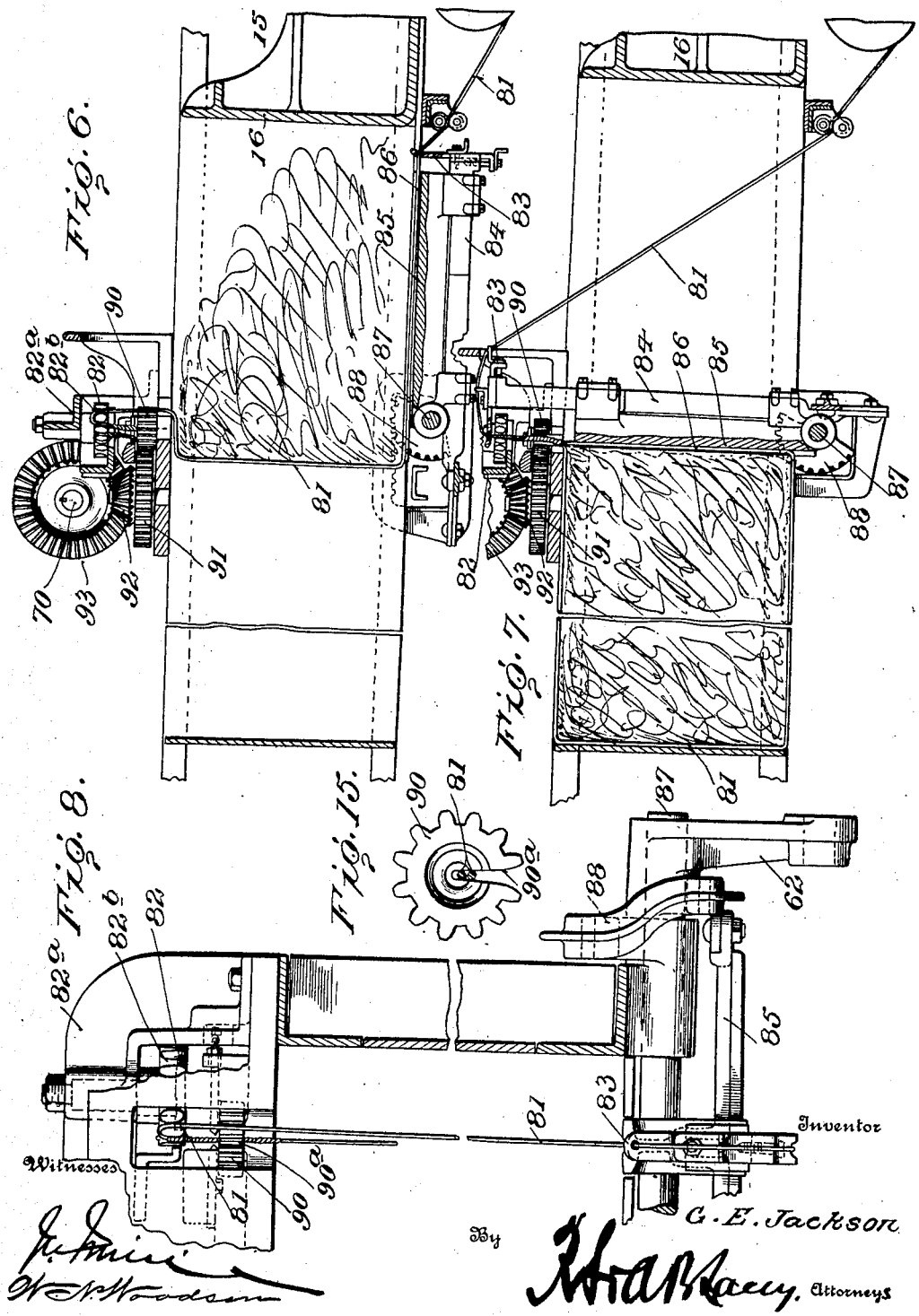

UNITED STATES PATENT OFFICE.

GEORGE E. JACKSON, OF NEWARK, ILLINOIS.

SELF-TYING BALING-PRESS.

No. 919,585.    Specification of Letters Patent.    Patented April 27, 1909.

Application filed July 9, 1908. Serial No. 442,644.

*To all whom it may concern:*

Be it known that I, GEORGE E. JACKSON, citizen of the United States, residing at Newark, in the county of Kendall and State of Illinois, have invented certain new and useful Improvements in Self-Tying Baling-Presses, of which the following is a specification.

This invention comprehends certain new and useful improvements in presses for baling hay and the like, and the invention has for its primary object, a simple, durable and efficient construction of baling press which will be entirely automatic throughout the operation of feeding the material into the press, compressing the same into a bale and encircling the bale with one or more wires and finally effectively tying the wires and discharging the bale.

The invention also has for its object an improved construction of mechanism of this character in which the feeding in of the material will be automatically stopped at a predetermined point, such stopping of the feeding apparatus being automatically governed by the bale itself after it has reached the required proportion.

A further object of the invention is an improved mechanism for feeding wires either from a coil, or a reel or spool up to the wire feeding, twisting and tying mechanisms, the said wire feeding mechanism being automatically set in operation by the plunger of the press and its concomitant parts.

The invention also has for its object, an improved construction of clutch mechanism which is so operated automatically that the packing fork will be held elevated in an inoperative position while the wires are being carried upwardly by the needles to the wire feeding and twisting devices and while the wires are twisted and the bale pushed outwardly to make room for another bale, the entire clutch mechanism being set into operation, at the proper time by automatic means governed by the bale itself, when the latter has reached a predetermined size. And the invention also has for its object a simple, durable and efficient construction of apparatus of this character which is composed of comparatively few parts and which may be lightly and yet strongly built.

With these and other objects in view as will more fully appear as the description proceeds, the invention consists in certain constructions, arrangements and combinations of parts that I shall hereinafter fully describe and claim.

For a full understanding of the invention, reference is to be had to the following description and accompanying drawings in which;

Figures 1 and 1$^a$ are side elevations of the front and rear halves respectively of the self tying baling press constructed in accordance with my invention; Fig. 2 is a side elevation of the major portion of the press looking at the side opposite to that illustrated in Figs. 1 and 1$^a$. Fig. 3 is a top plan view of the rear portion of the press; Fig. 4 is a perspective view of a portion of the clutch mechanism located at the rear end of the press; Fig. 5 is a top plan view on an enlarged scale, of that portion of the press where the twisters are located; Figs. 6 and 7 are longitudinal sectional views of that portion of the press where the tying and twisting operations are performed, the needles and needle carrying means being shown in two different positions in these views; Fig. 8 is a transverse sectional view through a portion of the press at the wire holding, twisting and wire feeding mechanisms; Fig. 9 is a detail perspective view of an operating rod designed to actuate the several clutches hereinafter specifically described; Fig. 10 is a side elevation thereof; Fig. 11 is a transverse sectional view thereof; Fig. 12 is a perspective view illustrating the front end of said actuating rod and means for the positive actuation of the clutches; Fig. 13 is a detail perspective view of the two parts of said clutch actuating mechanism; Fig. 14 is a detail perspective view of a swinging rocker which constitutes the actuating arm for the packing fork; Fig. 15 is a detail top plan view of one of the twisters that may be employed; and, Figs. 16 and 17 are top plan and side views illustrating the cutter mechanism.

The framework of my improved press may be of any desired construction and design and is preferably mounted upon traveling wheels as shown so that it may be drawn from place to place, as desired.

The reference numeral 1 designates the main drive shaft which extends transversely of the framework as shown and which may be driven in any desired way; in the present instance, I have shown the drive shaft 1 as equipped with a band wheel or pulley 2 around which the band or belt 3 extends, said belt leading from some suitable source of power not shown.

4 designates the fly or balance wheel on the opposite end of the shaft 1 from the pulley 2.

The drive shaft 1 carries a spur pinion 5 which meshes with a relatively large gear wheel 6 on one end of a transverse shaft 7 journaled on the framework of the press at the rear of drive shaft 1. Spur pinions 8 and 9 are also carried by this counter shaft 7, said pinions meshing respectively with relatively large gear wheels 10 and 11 mounted on a shaft 12 and designed to drive the plunger of the press, and for this purpose said wheels are connected together by a crank 13 in which the knuckle 14 of the pitman 15 is mounted so as to impart a reciprocating motion to the plunger as the wheels rotate.

16 designates the plunger of the press which may be of any desired construction and which is best outlined in Fig. 1.

In order to pack the hay into the compression chamber, I have provided a fork 17 which hangs down from the forward end of a rocking beam 18 fulcrumed intermediate of its ends on a standard 19 mounted on the framework. The rear end of the beam 18 carries a depending rocker 20 which constitutes a portion of the means for swinging the beam 18 in a direction to carry the fork downwardly said rocker being pivotally connected to the beam 18, the forwardly extending arm 22 of said rocker being pulled upon by a spring 24 so as to hold the downwardly extending arm 25 of said rocker at the forward limit of its swinging movement. This arm 25 is formed with an upwardly facing hook 26 and a rod 27 extends across the framework as shown and is designed to be engaged by said hook in order to limit the swinging or rocking movement of the beam 18 with the fork 17 at the downward limit of its traverse. Just below the hook 26 the lower extremity of the arm 25 of the rocker 20 is recessed as indicated at 28 (see Figs. 1ᵃ and 14) and this recessed lower extremity is designed to be engaged by a roller 29 (see Fig. 4) formed on an upwardly projecting arm of the knuckle 14 of the pitman, so that when the rear end of the pitman rises, the roller 29 will strike the lower extremity 28 of the arm 25 and thereby obviously rock the beam 18 so as to push the fork 17 into the hay in the compressing chamber and properly pack the same. It is to be understood, that the rear end of the beam 18 is heavier than the forward end so that the beam tends to assume an inoperative position illustrated in Fig. 2.

It will be seen that the arm 25 of the rocker 20 is formed with a rearwardly extending and downwardly facing hook 30; this hook is designed for engagement by a roller 31 on the upwardly projecting arms 32 of a shaft 33 journaled in the framework at the rear end thereof. (See Figs. 1ᵃ, 2, 3 and 4.) The shaft 33 (see Fig. 4) is formed at one end with a crank 34 pivotally connected to a casting 35 at the rear end of an operating rod 36, and a spring 34ᵃ is so connected to the rear sills of the press and the crank 34, as to exert a tendency to turn the shaft 33 in a direction to swing the arm 32 forwardly. The rod 36 extends forwardly along side of the framework, as best illustrated in Fig. 2, and carries a casting 37 (see Figs. 9, 10 and 11). The casting 37 is formed with a hook 38 designed to be engaged by a lug 39 formed on the plunger. As the plunger moves forwardly, the hook 38 will be found in the path thereof at the proper time, as will be hereinafter more specifically described, and as the said hook 38 is engaged by the lug 39 and the rod 36 pulled forwardly, the hook 38 will be instantly engaged by the pivoted locking dog 40 mounted at the side of the framework, and the rod 36 will be thus held at the forward limit of its movement. When this operation occurs, the roller 31 on the arm 32, which engaged the hook 30 will be swung rearwardly while engaged in said hook, and this will result in swinging the rocker 20 backwardly against the tension of the spring 24 to the rearward limit of its movement where its lower extremity 28 will be held out of the path of movement of the roller 29 carried by the rear end of the pitman and, consequently, the packing fork will not be actuated so long as the rocker 20 is thus held, and will be maintained in an inoperative position until the baling operation has been completed and the baled hay pushed outwardly to make room for the next bale to be formed.

In order that the rod 36 may be pulled forwardly as above described when the bale has reached the required size, I have provided a star wheel 41 which is mounted on a stub shaft on the framework and which is designed to engage the hay in the baling chamber so that the wheel will be turned intermittingly as the hay is fed in and compressed. On the same shaft with the star wheel 41 and movable therewith is a pinion 42 which meshes with a larger pinion 43 on a transverse shaft 44. The shaft 44 carries at its outer end a bracket 45 formed with lugs 46 and 46ᵃ and a pivoted dog 47 is attached as at 48 to said bracket, the rear end of said bracket being weighted as shown and being formed with a shoulder 47ᵃ designed to rest upon or against the lug 46ᵃ (see Figs. 12 and 13). As the shaft 44 is turned through the instrumentality of the star wheel 41 and its correlated parts, the dog 47, during a portion of the movement of said shaft, will rest against the lug 46ᵃ and the forward end of the dog 47 will be free from engagement with the other lug 46, but when the bale has reached the required size, the dog 47 will have brought its nose up against the rear side of the lever 49 and then the lug 46 will engage the rear edge of the dog 47 and push the dog against the rear face of said lever and shove the lever 49 off of the extended edge 44$^a$ of the bearing standard 44$^b$ in which one end of the shaft 44 is journaled, it being understood that the lever 49 is formed with a downwardly facing shoulder 49$^a$ by which it is caused to rest upon and be suspended from the extension edge 44$^a$ of the standard 44$^b$ until this operation is effected. The lever 49 is formed with an arm 50 and is pivoted as at 51 to the front end of the operating rod 36. As the lever 49 is thus pushed from its support on the standard 44$^b$, it and the operating rod 36 will be permitted to drop in order to bring the hook 38 into the path of movement of the lug 39 of the plunger.

It is to be particularly noted that the casting 37 carries a swinging releasing latch 37$^a$ which is mounted on the rear side thereof and which is capable of a free rearward movement on a pin 80 secured on the outer side of the casting and is prevented from a free forward swinging movement by means of a lug $a$ which is mounted on the rear of the casting. The parts are so arranged that the rod 36 will be dropped when the plunger is just about to engage the hook 38 and, as before described, the lug 39 of the plunger will then, by such engagement, pull the operating rod 36 forwardly until the lug 38 has been engaged by the dog 40. On the next rearward movement of the plunger the lug 39 will merely swing the releasing latch 37$^a$ aside, but on the next succeeding forward traverse of the plunger, the lug 39 will engage the rear edge of the latch 37 and swing the same into engagement with the lug $a$ and then manifestly raise the entire casting 37 and the operating rod 36. On the rising movement of the forward end of the operating rod 36, the upper end of the lever 49 will ride upon the rearwardly inclined lower edge 44$^c$ of the standard extension illustrated in Fig. 13 until said shouldered end 49$^a$ shall have passed the rear edge of such extension whereupon the weighted end 50 of the lever will effect a forward rocking movement of the upper end of the lever so that the shoulder 49$^a$ will engage with the supporting surfaces 44$^a$ and hold the lever 49 suspended in its upper position upon the standard 44$^b$ so as to maintain the hook 38 out of the path of the lug 39 on the plunger until the star wheel 41 has been again turned by and upon the reaching of the next bale to the proper size whereupon the operation of throwing the lever from its support and the succeeding operations I have described, will be repeated.

Referring now again to Fig. 4, it will be seen that in addition to the arm 32, the shaft 33 is formed with a relatively small downwardly projecting crank 52 which is connected by a link 53 with shipper levers 54. These levers extend in opposite directions as shown, and are provided at one end with yokes which are operatively connected to the clutches 55 splined on the shafts 56 and 57 journaled in the framework in transverse alinement with each other. A gear wheel 58 is mounted loosely on the shaft 56 and is designed to be engaged therewith by means of one of the clutches 55. This gear wheel 58 is intended to receive two actuations in the operation of forming and tying one bale, and, for this purpose, the large gear wheel 10 is formed with two toothed segments 59 spaced from each other as best seen in Fig. 1$^a$, said segments meshing in succession with the wheel 58; as will be hereinafter more specifically set forth; the wheel 58 is the prime mover for the needles that carry the wires up to the twisters, and in the operation of the machine, the first of the segments 59 as it engages the wheel 58 will effect the carrying of the wires up to the twisters, while the second of the segments will by a succeeding engagement with the wheel 58 effect the lowering of the needles so as to get them out of the way for the next batch of hay to be formed into a bale. Between the action of the two segments 59, the twisting operation is completed as will be hereinafter more specifically described. In addition to the wheel 58, the actuating elements for the needles embodies a crank or wheel 60 on the end of the shaft 56, and a pitman 61 extends forwardly and is connected at its front end with an arm 62 which will presently be described more in detail. The opposite clutch 55 on the shaft 57 is designed to engage a gear wheel 63 adapted for engagement by a toothed segment 64 formed on the large gear wheel 11, said segment 64 acting between the two segments 59 as has just been noted; at the outer end of the shaft 57 a bevel pinion 65 is secured and a corresponding pinion 66 meshes therewith, the pinion 66 being secured fast on the rear end of a forwardly and upwardly projecting shaft 67 extending along side of the framework. At its upper forward end, the shaft 67 has a bevel pinion 68 which meshes with a corresponding pinion 69 on one end of the twister shaft 70. (See Fig. 5.)

The hay to be baled is fed into the press by means of any suitable automatically operated conveyer, say of the endless apron type (not shown), said feeder being operated by means of a chain 71 which extends over a sprocket wheel 72 on one end of a longitudinally extending shaft 73 journaled on the framework just in rear of the tying mechanism. The shaft 73 carries at its rear end a miter pinion 74 meshing with a similar pinion 75 on the main drive shaft 1. The sprocket wheel 72 is loose on the drive shaft 73 and is normally held in engagement therewith by means of a spring pressed clutch 76. This clutch is connected to a yoke which is carried by the rocking shaft 77 which extends transversely of the framework, and an arm 78 extends downwardly from said shaft 77 at one end thereof and is slotted as at 79 to accommodate the pin 80 carried by the casting 37. Hence it will be seen that as the rod 36 is pulled forwardly, the arm 78 will be swung to turn the shaft 77, and the clutch 76 will be disengaged from the wheel 72 so as to stop the feeding operation during the wire feeding and twisting operations.

The wires 81 may be fed from a coil or a spool and any desired number of wires may be used. In the present instance, three are illustrated and a wire spool is employed.

At the beginning of the wire feeding operation, the wires are fed by hand up through suitable openings in the bed of the press to the wire holders 82, that are journaled to turn about vertical axes on an arched supporting beam 82ª extending across the framework, and that are provided with a series of relatively short blunt fingers 82ᵇ extending rigidly therefrom. As the hay is fed into the press and packed, the wires will extend around the front and bottom of the bale and as the bale is finally compressed and pushed outwardly as indicated in Fig. 7, the wires will extend around the top, front and bottom. In order to complete the encircling of the bale with the wires, the wires are threaded through needles 83 that are secured to needle arms 84 mounted for a longitudinal sliding movement in a separator frame 85, said frame being provided with grooves 86 for the wires, said grooves being in alinement with the twisting mechanism when the needle arms have carried the needles upwardly to the twisters and wire holders. The said separator frame 85 is mounted upon a transverse shaft 87. Toothed segments 88 are mounted in a stationary manner concentric to the shaft 87, and interiorly toothed racks 89 incase and engage said segments, said racks being rigidly secured to the needle carrying arms 84. Thus it will be seen that as the shaft 87 is turned to carry the needles 83 up to the wire holders and twisters, the engagement of the racks with the stationary segments will have an upward clamping action on the segments, and a longitudinally or upwardly sliding movement will thereby be imparted to the needle arms 84 in addition to the rotary or swinging movement, in order that the needles 83 may properly register with the wire holders and twisters when the needles are swung upwardly. This swinging movement and its accompanying longitudinal movement as the needle arms swing upwardly afford the means whereby the needle carrying arms in their lowering movement may quickly get out of the way of the plunger as it moves forwardly to compress the hay. The shaft 87 is connected at one end to the arm 62 which is in turn connected to the front end of the pitman or connecting rod 61 hereinbefore described.

The first half revolution of the crank wheel 60 brings the needles and needle holders to the upper position at the same time automatically moving the wire holder a distance of one projection. This carries the twisted ends out of the way and allows the end of the wire which has been held by the holder and a loop brought up by the needles to stay at the center of the twisting pinions 90 which are formed with radially extending slots 90ª as best seen in Fig. 15. The slots in the twister pinions are too narrow to allow the wires to pass each other so that when the twisters are rotated, with their engagement with the spur pinions 91 journaled on the stub shafts in the framework, the wires will twist as shown best in Figs. 6, 7 and 8. The stub shafts which carry the spur pinions 91 also carry the bevel pinions 92 meshing with the pinions 93 on the transversely extending twister shaft 70. The loop or wire shown in Figs. 6, 7 and 8 will be formed upon the next projection on the wire holders as the needles return to the lower position below the press; by the second half of the revolution of the crank wheel 60, the guides 94, as best seen in Figs. 5, 6, and 7 tend to force the wires which the needles carry to go between the projections of the fingers of the wire holders and prevent them from slipping off after they are twisted together.

The wires it is to be understood are held by the wire holders 82 and are twisted by the twister pinions 90, and after they have been twisted, they are cut. The cutting mechanism, illustrated best in Figs. 16 and 17, consists of a plurality of stationary cutters 95 supported on one of the transverse beams of the framework and a series of movable cutters 96 all of which are carried by a transversely extending cutter bar 97. As seen best in Fig. 16, the cutter bar 97 is of angular formation so as to pass around and back of one twister pinion to the next, and it is provided at one end with a roller 98 designed to be engaged by a cam 68ª on the head of the pinion 68. During the rotation of the shaft 67 to operate the twisters, the cam 68ª on the beveled gear 68 moves the cutter bar 97 horizontally in a direction to cause all the twisted wires to be cut at the same time. The cam 68ª is so timed, that the cutting is finished and the cutter bar is drawn back by any suitable spring (not shown), just as the motion of the shaft 67 stops, leaving cutters 95 and 96 in spaced relation to each other ready for the next wires to be fed to the centers of the twister pinions through the slots 90ª thereof.

Briefly describing the general operation of the machine, the details of the operation having been set forth it may be stated that when the machine is started the wires 81 are fed by hand through the needles 83 and up to the wire holders 82 and are looped over the finger thereof, the needles being then in their lowered positions. As the machine is started by the drive shaft 1, the plunger will be reciprocated while at the same time, every revolution of the two gear wheels 10 and 11 will cause the engagement of the roller 29 with the rocker 20 and rock the beam 18 to pack the hay that is being fed into the compression chamber. As soon as the bale has reached the required size, an intermittent movement of the star wheel 41 will cause the lever 49 to be pushed from the bracket 44 and the operating rod 36 will drop and the lug 39 will engage the hook 38 and move the rod 36 forwardly until the hook 38 is engaged by the dog 40 and the rod is held at the forward limit of its movement. This forward movement of the rod 36 will throw the sprocket 72 for the feeding mechanism out of gear and the feeding mechanism will stop while at the same time such movement of the rod 36 will rock the shaft 33 so that the arm 32 thereof will swing the rocker 20 rearwardly and hold the same out of operative relation to the roller 29 of the pitman 15. Hence the packing fork 17 will be maintained in an inoperative position. Manifestly also, the rocking of the shaft 33 will throw the clutches 55 into engagement with their respective gear wheels 58 and 63 and the wire feeding mechanism will be actuated to carry the wires up around the rear sides of the bale as illustrated in Fig. 7, the needles will be held in an upper position while the twisting and cutting of the wires is accomplished and the second segment 59 of the gear wheel 10 will then effect the lowering of the needles so as to feed the wires downwardly again in front of the next bale of hay to be formed, it being understood that the wires are fed through the needles in this lowering movement of the needles, the end of the wires being held in the fingers of the wire holder. As soon as these steps have been performed, the lug 39 of the plunger will again raise the operating rod 36 until it is again suspended by the shoulder lever 49 and the spring 34ª will so turn the shaft 33 as to move the arm 32 out of the way of the rocker 20 and the clutches 55 out of engagement with their gear wheels 58 and 63, so that the feeding operation and packing operation will be resumed while the wire feeding and twisting mechanisms are inoperative.

Having thus described the invention, what is claimed as new is:

1. In a baling press, the combination of a packing fork, a rocking beam to one end of which said fork is connected, a plunger, means for operating said plunger, a rocker secured to the other arm of said beam and arranged to be engaged by the plunger operating means to rock the beam, wire feeding and twisting mechanisms, and means for automatically holding said rocker out of the path of said plunger operating means during the operation of the said wire feeding and twisting mechanisms.

2. In a baling press, the combination of a packing fork, a rocking beam to the forward end of which said fork is connected, a plunger, means for operating said plunger, said means including a crank and crank wheels, a pitman connecting said crank with the plunger, a rocker secured to and depending from the rear arm of the beam and arranged to be engaged by said crank to rock the beam, wire feeding and twisting mechanism, means for actuating the same, and a transversely extending rod and support therefor, the said rocker being provided with a forwardly facing hook designed to engage said rod whereby to limit the upward movement of the rocker.

3. In a baling press, the combination of a rocking beam, a fork carried on the forward end of said beam, a plunger, rotating means arranged to actuate said plunger, a rocker secured to and depending from the rear arm of the beam and normally held in the path of movement of said plunger operating means whereby the latter will engage the rocker and push the same upwardly to rock the beam and to depress the rocker, said rocker being formed with a rearwardly and outwardly facing hook, wire feeding and tying mechanisms, means for automatically actuating the same, and means for engaging the said hook of the rocker for holding the rocker in an inoperative relation to the plunger operating means during the operation of the wire feeding and tying mechanisms.

4. In a baling press, the combination of a packing fork, a rocking beam to the forward end of which said fork is connected, a rocker carried by and depending from the rear end of said beam, means for intermittently engaging said rocker to push the same upward to rock the beam, and means actuated by and upon the completion of a bale, automatically moving the said rocker out of the path of movement of said pushing means.

5. In a baling press, the combination of wire feeding and tying mechanisms, means for actuating the same, means for setting said actuating means into operation, said means actuating an operating rod, a hook carried by said rod, a plunger, means for reciprocating said plunger, the plunger being provided with a lug arranged to strike said hook and push the operating rod forwardly, a dog adapted to engage and hold the rod stationary at the limit of its forward movement, and means for permitting a subsequent rearward movement of the plunger without disengaging the hook from the dog and for causing the plunger to disengage the hook from the dog upon the next succeeding forward movement of the plunger.

6. In a baling press, the combination of a packing fork, a longitudinally disposed rocking beam to the forward end of which said fork is connected, a plunger, means for operating said plunger, said means including a crank, and crank wheels, a pitman connected to said crank and the plunger, a rocker secured to and depending from the rear arm of the beam, and arranged to be engaged by said crank to rock the beam, wire feeding and twisting mechanisms, and means for automatically holding said rocker out of the path of said crank during the operation of the wire feeding and twisting mechanisms.

7. In a baling press, the combination of a rocking beam, a packer carried on the forward arm of said beam, a plunger, crank wheels provided with a crank to which the pitman is connected, a rocker secured to and depending from the rear arm of the beam and normally held in the path of movement of said crank whereby the crank will engage the rocker and push the same upwardly to rock the beam and to depress the packer, said rocker being formed with a rearwardly extending, downwardly facing hook, wire feeding and tying mechanisms, and means for automatically actuating said hook and swinging the rocker rearwardly out of the path of movement of the crank during the operation of the wire twisting and tying mechanisms.

8. In a baling press, the combination of a rocking beam, a packer carried by the forward arm of said beam, a rocker secured to and depending from the rear arm of said beam, a plunger, means for reciprocating said plunger, and for engaging said rocker to push the same upwardly to rock the beam in a direction to depress the packer, wire feeding and tying mechanisms, a driving mechanism therefor, embodying clutches, and means for moving said clutches to operative position, and an arm carried by said last named means and arranged to engage the rocker and swing the same out of operative relation to its actuating means during the operation of the wire feeding and tying mechanisms.

9. A baling press, comprising a rocking beam, a packer carried by the forward arm of said beam, a rocker secured to and depending from the rear arm of said beam, a plunger, a pitman connected to said plunger, crank wheels provided with a crank, to which the rear end of the pitman is connected, means for turning said wheels, wire feeding and tying mechanisms, and means for automatically moving the rocker out of operative relation to its actuating means during the operation of the wire feeding and tying mechanisms.

10. In a baling press, the combination of wire feeding and tying mechanisms, means for actuating said mechanisms in succession, and for subsequently moving the wire feeding mechanism to an inoperative position, said actuating means including clutches and an actuating shaft for said clutches, an operating rod operatively connected to said shaft, a plunger, means for actuating said plunger, and means for positively moving said operating rod by and upon the movement of the plunger, as and for the purpose set forth.

11. In a baling press, the combination of wire feeding and tying mechanisms, means for actuating the same in succession and for subsequently moving the feeding mechanism to an inoperative position, driving mechanism therefor, said driving mechanism including clutches, and an actuating shaft for said clutches, an operating rod operatively connected to said shaft, a plunger, means for reciprocating said plunger, means for effecting a connection between said operating rod and said plunger upon the forward movement of the plunger, and means for automatically holding said rod out of operative relation to said plunger until the completion of a bale to a predetermined size.

12. In a baling press, the combination of wire feeding and tying mechanisms, actuating means therefor, means for setting said actuating means into operation, said last named means including an operating rod provided with a hook, a plunger, means for reciprocating said plunger, the plunger being provided with a lug designed to engage said hook, and move said operating rod during a forward movement of the plunger, and means for automatically holding said operating rod in a position where its hook will be out of the path of the plunger until the completion of a bale, and for subsequently permitting the rod to move in a direction to carry its hook into operative relation to said plunger.

13. In a baling press, the combination of wire feeding and tying mechanisms, actuating means therefor, means for setting said actuating means into operation, said last named means including an operating rod provided with a hook and arranged for an upward and downward movement, a lever carried by the forward end of said operating rod, means for engaging said lever and for supporting it in a position to hold the operating rod raised, a plunger, means for reciprocating said plunger, the plunger being provided with a lug designed to engage said hook in the lowered position of the rod, and means for automatically disengaging the lever from its support and permitting the rod to drop as and for the purpose set forth.

14. In a baling press, the combination of wire feeding and tying mechanisms, means for actuating the same, means for setting said actuating means into operation, said last named means embodying an operating rod, a hook carried by said rod, a swinging releasing latch also carried by said rod, a plunger, means for reciprocating said plunger, the plunger being provided with a lug arranged to strike said hook and push the operating rod forwardly, means for automatically holding said rod with its hook out of the path of the lug until the completion of a bale, and for subsequently permitting the rod to drop and carry its hook into the path of the lug, and a dog adapted to engage said hook and hold the same stationary at the limit of its forward movement, the lug of the plunger being arranged upon a subsequent movement to engage the releasing latch and move the operating rod in a direction to carry its hook out of engagement with the dog, and means for automatically returning the latch to the rear limit of its movement.

15. In a baling press, the combination of wire feeding and tying mechanisms, means for actuating the same, means for setting the actuating means into operation, said last named means including a longitudinally extending rod provided with a hook, a lever carried by the forward end of said rod, the rod and lever being arranged for an up and down movement, a standard upon which the lever is designed to rest upon the upper limit of its movement and the upper limit of the movement of the operating rod, a plunger, means for reciprocating said plunger, the plunger being provided with a lug arranged to strike said hook in the lowered position of the operating rod, and means for automatically disengaging the lever from its support and permitting the rod to drop upon the completion of a bale to a predetermined size.

16. In a baling press, the combination of a wire feeding and tying mechanism, actuating means therefor, means for setting the actuating means into operation, said last named means including a longitudinally extending operating rod, a lever carried by the forward end of said rod, a star wheel, a support therefor, the star wheel being arranged to engage the material as it is compressed whereby to intermittingly turn the star wheel, the operating rod and lever being mounted for an up and down movement, a support for holding said lever and operating rod at the upper limit of their movement, means actuated by the star wheel for pushing the lever off of its support, and permitting the operating rod to drop, a plunger provided with a lug, means for operating said plunger, the operating rod being provided with a hook designed in the lowered position of the rod to be engaged by said lug whereby to pull the rod forwardly and set into operation the actuating means for the wire feeding and tying mechanisms, means for holding said operating rod at the limit of its forward movement, and means operated by the plunger for subsequently releasing said operating rod from said holding means and for raising it automatically thereby causing the engagement of the lever with its support.

17. In a baling press, the combination of wire feeding and tying mechanisms, actuating means therefor, means for setting said actuating means into operation, said last named means including the longitudinally extending rod 36 arranged upon a forward movement to set the actuating means for the wire feeding and tying means into operation, actuating mechanisms for a material feeder, and an operative connection between said operating rod and said last named actuating mechanisms, and means for rendering it inoperative by and upon the forward movement of the operating rod.

18. In a baling press, the combination of wire feeding and tying mechanisms, actuating means therefor, means for setting said actuating means into operation, said last named means including a longitudinally extending rod, a lever carried by the forward end of said rod and formed with a downwardly facing shoulder, a star wheel adapted to be engaged and intermittingly turned by the material in the baling chamber, a shaft operatively connected by said star wheel so as to be turned thereby, a standard forming one of the supports for said shaft, said standard being formed with an extended surface 44$^a$, a bracket carried by said shaft, a releasing dog carried by said bracket and pivotally connected thereto, said dog being in the path of the shoulder end of said lever, said shoulder end normally resting upon said surface 44$^a$, and means carried by the bracket for engaging said dog and pushing the same against the lever whereby to slide the same off of the supporting surface 44$^a$.

19. In a baling press, a plunger, means for reciprocating the same the combination of a wire feeding and tying mechanism, actuating means therefor, means for setting said actuating means into operation, said last named means including a longitudinally extending rod arranged to be operated by the plunger, a lever secured to the forward end of said rod and formed with a downwardly facing shoulder, a standard provided with a bearing surface with which said shoulder is designed to engage whereby to hold the operating rod out of operative relation to the plunger, a star wheel arranged to be intermittingly turned by the material in the baling chamber of the press, a shaft operatively connected to said star wheel so as to be turned thereby, said shaft being journaled in one end of said standard, a bracket carried by one end of said shaft, and a weighted dog pivotally connected to said bracket, the bracket being formed with a lug adapted to spring up against the rear edge of the dog and push the same against the lever whereby to disengage the lever from the standard.

20. In a baling press, the combination of a wire feeding and tying mechanism, means for actuating the same, means for setting said actuating means into operation, said last named means including a longitudinally extending rod arranged for an up and down movement, a lever carried by the forward end of said rod, a support with which said lever is designed to engage whereby to hold the lever and the rod at the upper limit of their up and down movement, a plunger, means for reciprocating said plunger, the plunger being arranged to move the operating rod forwardly into the lowered position of the rod, means for automatically moving said lever from its support and permitting the lever and rod to drop at a predetermined point in the compressing operation, means for subsequently automatically releasing the rod and lever and causing a subsequent engagement of the lever with its support at the completion of the operation of the wire feeding and tying mechanism.

21. In a baling press, the combination of a plunger, a pitman connected to said plunger, two vertically disposed crank wheels, a crank connecting said wheels together and connected to the rear end of said plunger whereby to reciprocate the plunger by and upon the rotation of said wheels, transversely extending shafts, spur gears loosely mounted upon said shafts, means for automatically coupling said spur gears and their shafts by and upon the completion of a bale of a predetermined size, wire feeding mechanism, wire holders, an operative connection between one of said spur gears and the wire feeding mechanism, wire tying mechanism, an operative connection between the other spur gear and the wire tying mechanism, two toothed segments secured to one of said crank wheels and spaced from each other and arranged to mesh with the wire feeding actuating spur gear, and a single pinion carried by the other crank wheel and arranged to engage with the other spur gear at the interval between the two engagements of the first named segments and their spur gears.

22. In a baling press, the combination of wire holders, wire twisters, needles through which the wires are threaded to the wire holders, a separator frame, needle carrying arms having a longitudinal movement in said separator frame, means for automatically swinging said separator frame upwardly to carry the needles to the wire holders, and means for automatically effecting a longitudinal movement of the needle carrying arms in the separator frame upon the upward movement of the latter.

23. In a baling press, the combination of a supporting framework, compression mechanism mounted therein, means for actuating the same, wire twisting mechanism, needle carrying arms arranged to move toward and from the wire twisting mechanism and carrying the wire thereto, and actuating means for the needle carrying arms and the wire twisting mechanism, said last named means including two wheels journaled at opposite sides of the framework, one for the twisting mechanism and the other for lifting the needle carrying arms, the first of these two wheels being provided with a toothed segment and the other of these wheels carrying two spaced segments acting respectively before and after the other segment, and means actuating said segments for first removing the needle carrying arm toward the twisters, then actuating the twisters, and finally moving the needle carrying arms away from the twisters.

24. In a baling press, the combination of wire holders, wire twisters, needles through which the wires are passed to the wire holders, a pivoted separator frame, needle carrying arms having a longitudinal movement in said separator frame, means for automatically swinging said separator frame forwardly to carry the needles to the wire holders, said needle carrying arms being provided with interiorly toothed racks, and stationary toothed segments mounted on the axles of said frame and engaging said racks, for the purpose specified.

25. In a baling press, the combination of compressing mechanism, means for actuating the same, wire feeding and twisting mechanisms, means for actuating said twisting mechanism, said actuating means including a shaft 67, a wire cutting mechanism, and means for actuating said wire cutting mechanism, said last mentioned means including a cam carried by said shaft.

In testimony whereof I affix my signature in presence of two witnesses.

GEORGE E. JACKSON. [L. S.]

Witnesses:
SILAS RASMUSSON,
J. C. JOHNSON.